United States Patent
Muhassin et al.

(10) Patent No.: US 12,051,224 B2
(45) Date of Patent: *Jul. 30, 2024

(54) SYSTEMS AND METHODS FOR CAMERA ALIGNMENT USING PRE-DISTORTED TARGETS

(71) Applicant: Motional AD LLC, Boston, MA (US)

(72) Inventors: Nijumudheen Muhassin, Jefferson Hills, PA (US); Yew Kwang Low, Singapore (SG); Jayesh Dwivedi, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,051

(22) Filed: Apr. 24, 2023

(65) Prior Publication Data
US 2023/0334701 A1 Oct. 19, 2023

Related U.S. Application Data

(63) Continuation of application No. 17/360,845, filed on Jun. 28, 2021, now Pat. No. 11,636,623.

(51) Int. Cl.
*H04N 23/55* (2023.01)
*G06T 7/80* (2017.01)

(52) U.S. Cl.
CPC ............. *G06T 7/80* (2017.01); *H04N 23/55* (2023.01)

(58) Field of Classification Search
CPC ... G06T 7/80; G06T 2207/30204; G06T 7/73; G06T 2207/10004; G06T 2207/20081; G06T 2207/20084; G06T 2207/30252; G06T 5/80; G06T 2207/30168;
(Continued)

(56) References Cited

U.S. PATENT DOCUMENTS

| 3,912,395 A | 10/1975 | Voggenthaler |
| 8,576,390 B1 | 11/2013 | Nunnink |

(Continued)

FOREIGN PATENT DOCUMENTS

| CN | 107833254 A | 3/2018 |
| EP | 3862806 A1 | 8/2021 |

(Continued)

OTHER PUBLICATIONS

Bauer, M et al., "Geometrical camera calibration with diffractive optical elements", Optics Express, Dec. 2008, vol. 16, pp. 20241-20248.
(Continued)

*Primary Examiner* — Mekonnen D Dagnew
(74) *Attorney, Agent, or Firm* — Knobbe, Martens, Olson & Bear, LLP

(57) ABSTRACT

Provided are systems and methods for camera alignment using pre-distorted targets. Some methods described include selecting a configuration of shapes, and determining targets by pre-distorting the shapes according to the inverse of the distortion function of the lens system to be aligned. Images of pre-distorted targets are then compared to the original configuration of shapes, to perform camera alignment. Alignment is thus accomplished in simpler and more accurate manner. Systems and computer program products are also provided.

24 Claims, 8 Drawing Sheets

(58) Field of Classification Search
CPC ........ G06T 7/11; H04N 23/55; H04N 17/002; G02B 7/003; G02B 7/28; G02B 27/64; B60R 1/22
See application file for complete search history.

(56) References Cited

U.S. PATENT DOCUMENTS

| | | | | |
|---|---|---|---|---|
| 8,773,514 | B2* | 7/2014 | Gharib | G06T 7/521 |
| | | | | 348/42 |
| 9,438,813 | B2* | 9/2016 | Gilbert | H04N 9/3176 |
| 10,788,316 | B1 | 9/2020 | Kalscheur | |
| 11,070,709 | B2 | 7/2021 | Lee et al. | |
| 11,636,623 | B2 | 4/2023 | Muhassin et al. | |
| 2012/0154636 | A1* | 6/2012 | De Haan | G03B 15/02 |
| | | | | 348/E9.053 |
| 2013/0121617 | A1 | 5/2013 | Serrels et al. | |
| 2014/0307055 | A1* | 10/2014 | Kang | G06T 7/586 |
| | | | | 348/47 |
| 2015/0253123 | A1 | 9/2015 | Braker et al. | |
| 2016/0356978 | A1 | 12/2016 | Osborne | |
| 2018/0164490 | A1 | 6/2018 | Ma et al. | |
| 2019/0011567 | A1 | 1/2019 | Pacala et al. | |
| 2019/0147625 | A1 | 5/2019 | Jia et al. | |
| 2020/0133001 | A1 | 4/2020 | Guido et al. | |
| 2020/0257353 | A1 | 8/2020 | Dai | |
| 2020/0257356 | A1 | 8/2020 | Rosell | |
| 2020/0264043 | A1 | 8/2020 | Allen | |
| 2021/0033255 | A1 | 2/2021 | Kuffner, Jr. | |
| 2021/0044725 | A1 | 2/2021 | Powell | |
| 2021/0112238 | A1 | 4/2021 | Bylicka et al. | |
| 2021/0223568 | A1 | 7/2021 | Makinen et al. | |
| 2021/0233274 | A1 | 7/2021 | Silva | |
| 2021/0240005 | A1 | 8/2021 | Fattal et al. | |
| 2021/0390739 | A1 | 12/2021 | Jia et al. | |
| 2022/0414930 | A1 | 12/2022 | Muhassin et al. | |
| 2023/0237701 | A1 | 7/2023 | Muhassin et al. | |

FOREIGN PATENT DOCUMENTS

| | | |
|---|---|---|
| GB | 2417790 A | 3/2006 |
| JP | 2008-154195 A | 7/2008 |
| WO | WO 2016/160704 A1 | 10/2016 |

OTHER PUBLICATIONS

Sae On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2203405.2, dated Sep. 12, 2022.
Great Britain Office Action issued for Application No. GB 2203405.2, dated Mar. 13, 2023.
Great Britain Office Action issued for Application No. GB 2203405.2, dated Aug. 25, 2023.
Great Britain Office Action issued for Application No. GB 2203487.0, dated Sep. 14, 2022.
Great Britain Office Action issued for Application No. GB 2203487.0, dated Nov. 6, 2023.
Great Britain Office Action issued for Application No. GB 2203178.5, dated Aug. 31, 2022.
Korean Office Action issued for Application No. KR 10-2022-0038215, dated Jan. 17, 2024.
Korean Office Action issued for Application No. KR 10-2022-0037543, dated Jan. 12, 2024.
Korean Notice of Allowance issued for Application No. KR 10-2022-0030283, dated Feb. 26, 2024.
U.S. Appl. No. 17/360,842**, filed Jun. 28, 2022, Muhassin et al.
U.S. Appl. No. 17/581,712**, filed Jan. 21, 2022, Muhassin et al.

* cited by examiner

SYSTEMS AND METHODS FOR CAMERA ALIGNMENT USING PRE-DISTORTED TARGETS

RELATED APPLICATIONS

Any and all applications for which a foreign or domestic priority claim is identified in the Application Data Sheet as filed with the present application are incorporated by reference under 37 CFR 1.57 and made a part of this specification. This application is a continuation of U.S. patent application Ser. No. 17/360,845, filed on Jun. 28, 2021, and entitled SYSTEMS AND METHODS FOR CAMERA ALIGNMENT USING PRE-DISTORTED TARGETS, which is incorporated herein by reference in its entirety.

BACKGROUND

Current digital camera systems often employ one or more lenses, and a sensor array to detect light or other radiation focused by the lenses. Alignment between lenses and the sensor array is an important factor in camera performance, including in applications such as autonomous vehicle systems. Camera alignment is not without its challenges, however. For example, alignment processes commonly employ flat target boards and collimator targets which, in systems such as wide angle cameras, may appear excessively distorted and thus lead to inaccurate alignment. Alignment tolerances in both the camera itself and its assembly may also lead to inaccurate estimation of lens center, resulting in difficulties when performing processes such as camera calibration.

DETAILED DESCRIPTION

Figure 1:
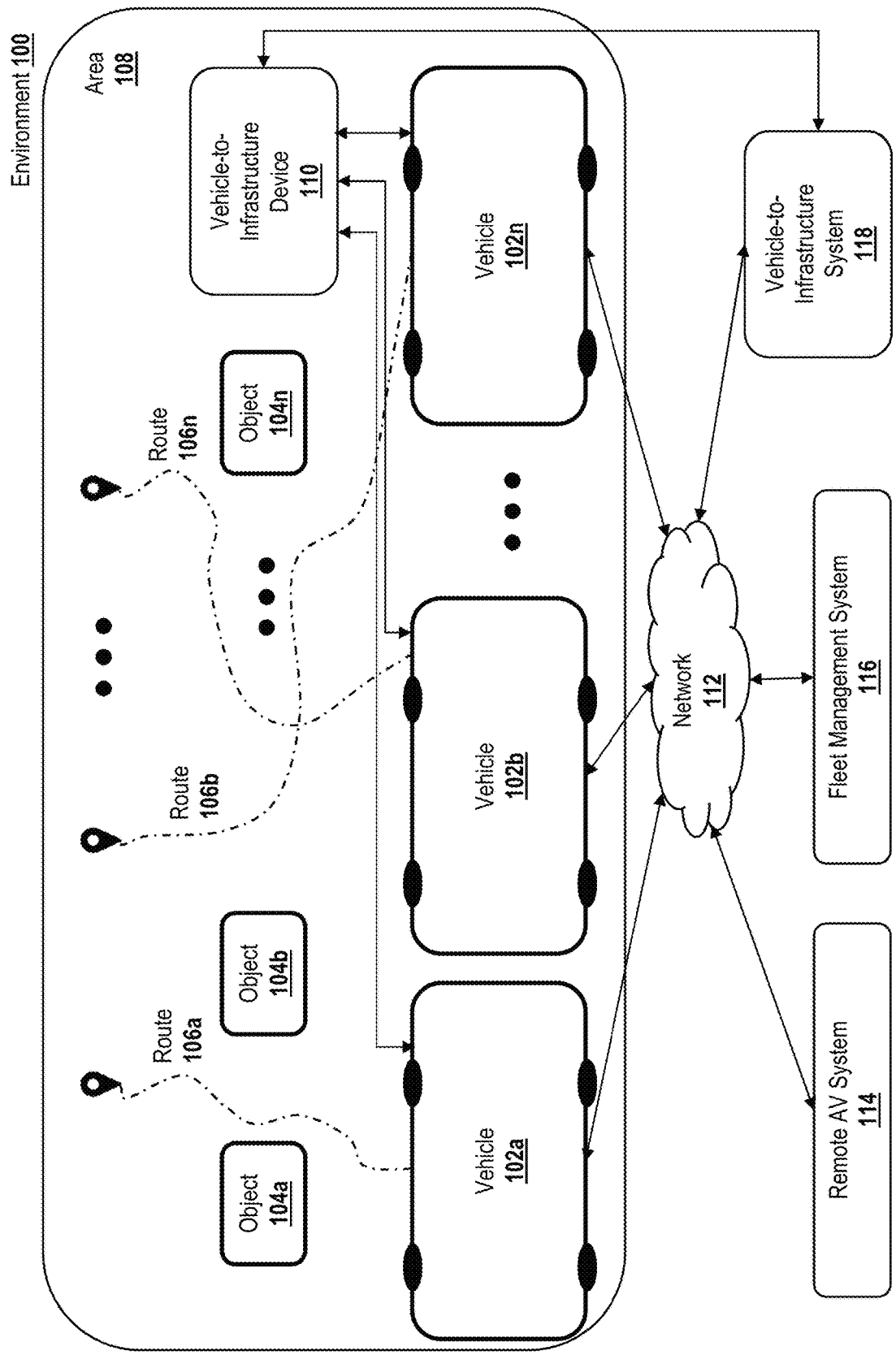
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device)

includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
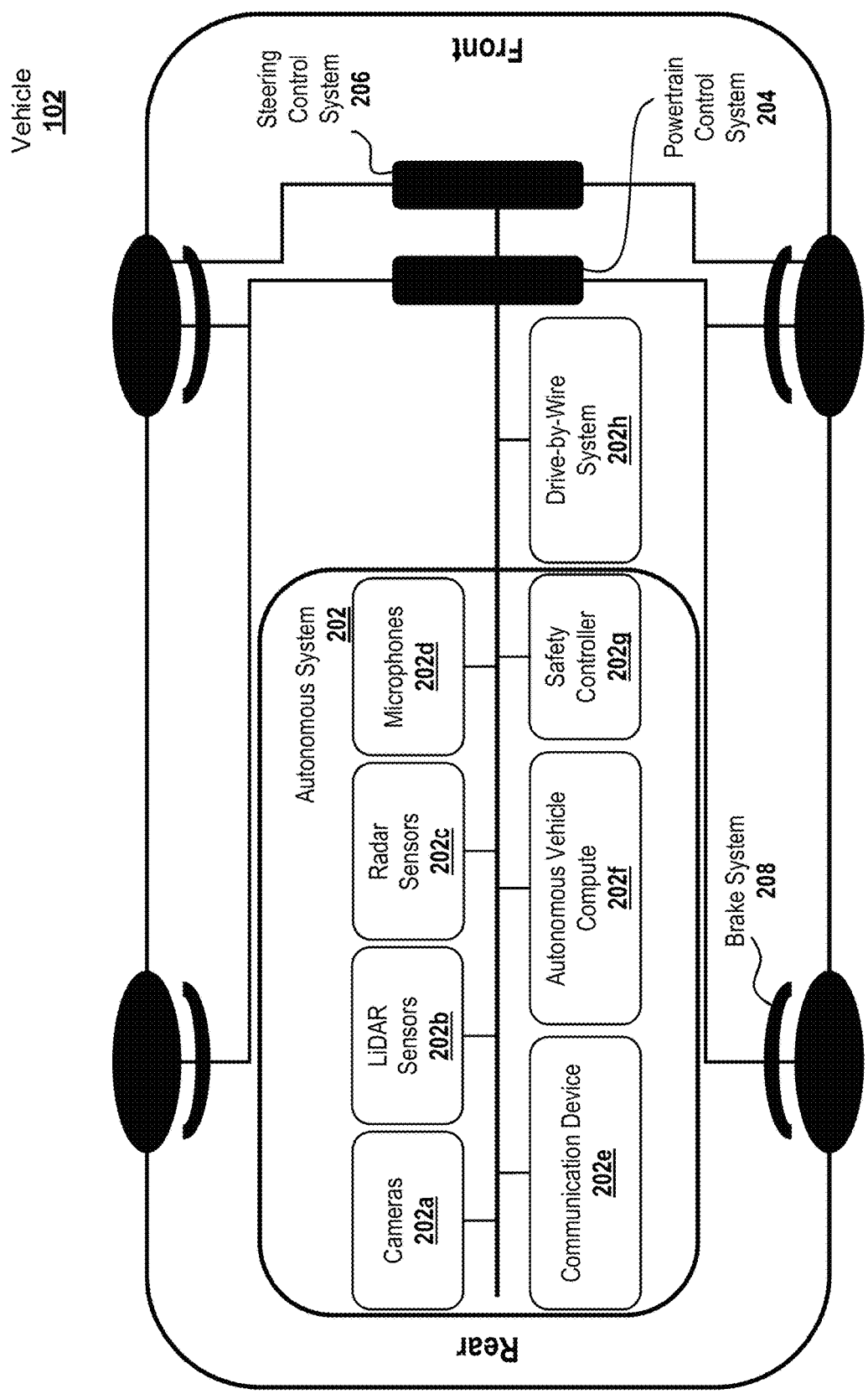
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
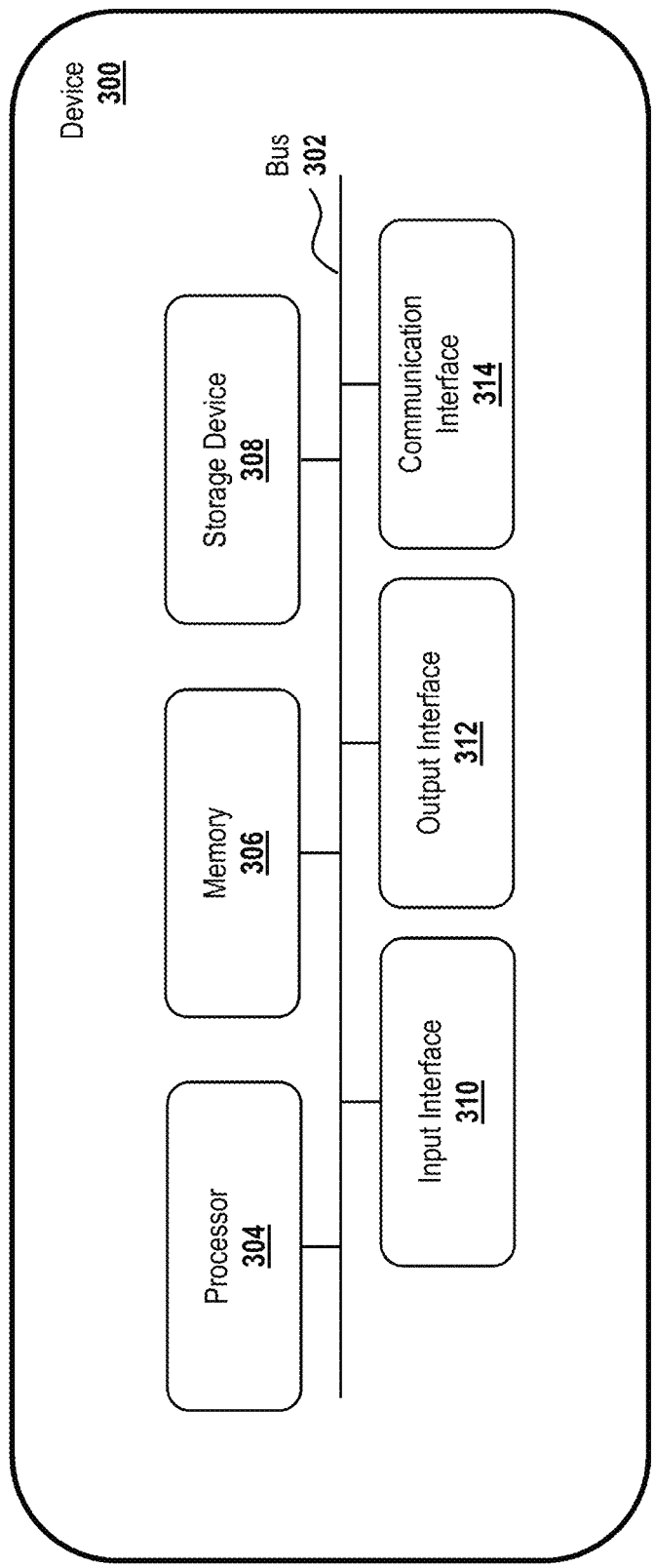
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a are configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

LiDAR sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of [continue list in similar manner for all devices contemplated in FIGS. 1-3], and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
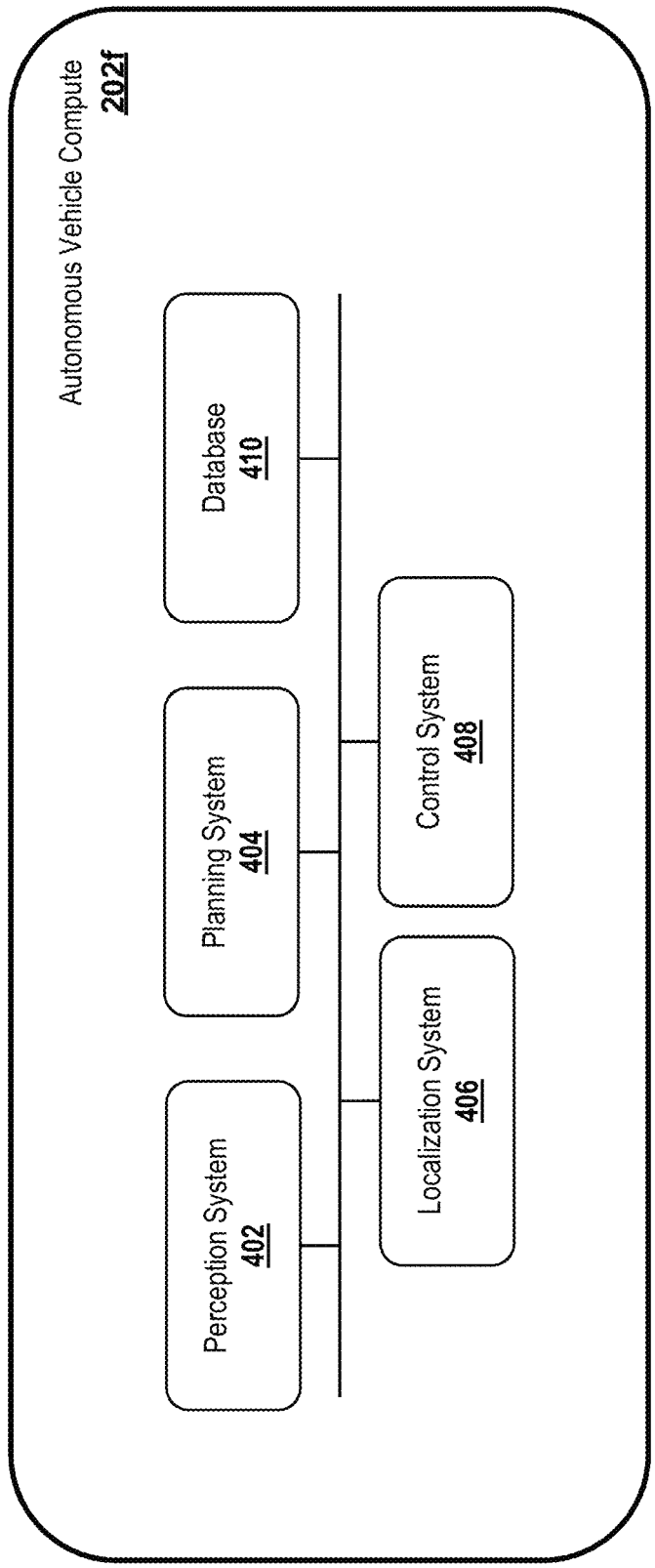
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
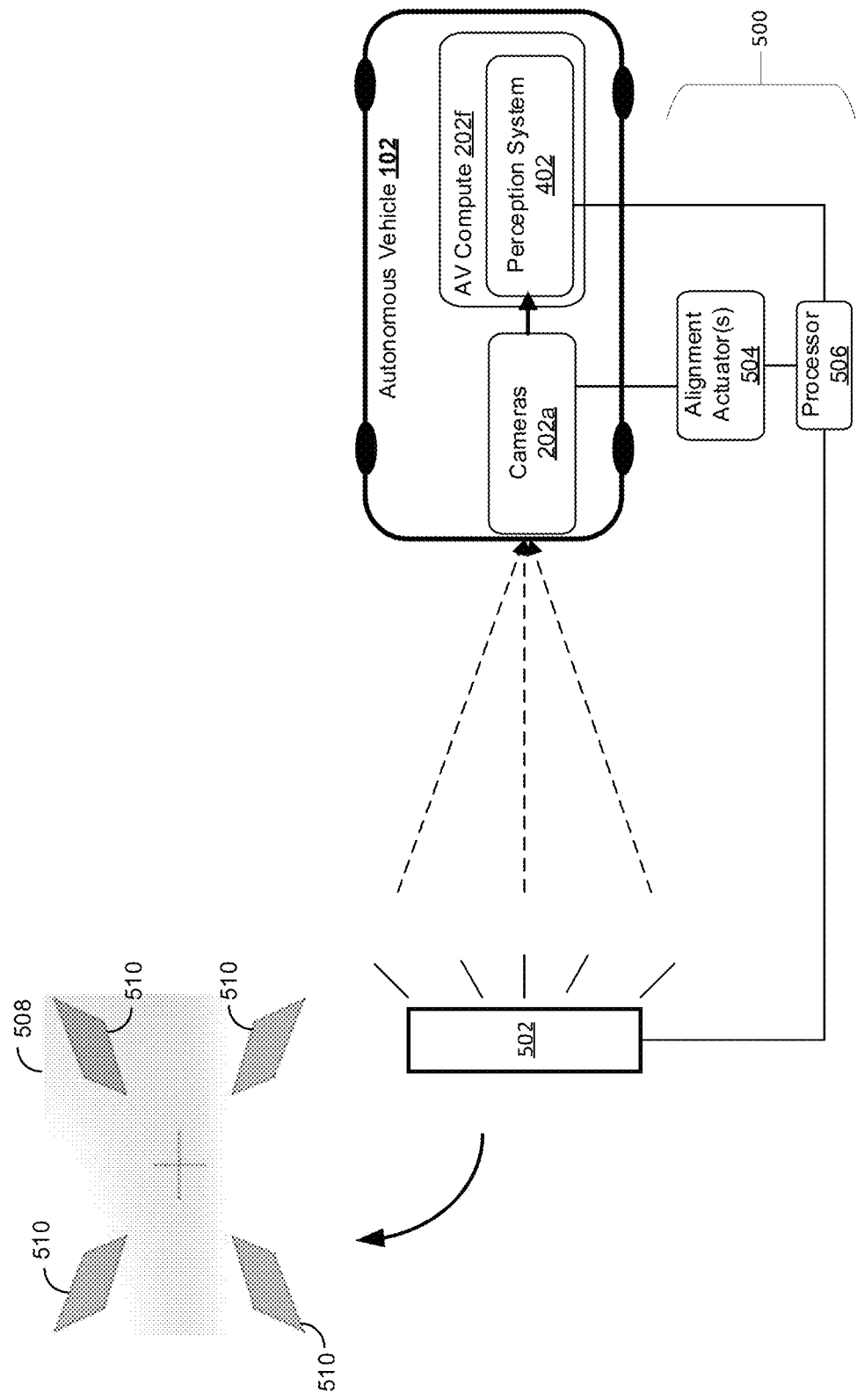
FIG. 5 is a diagram of an implementation of a process for camera alignment using pre-distorted targets.

Referring now to FIG. 5, illustrated is a diagram of an implementation of a process for camera alignment using pre-distorted targets. In some embodiments, this implementation may be carried out in alignment processes for any of cameras 202a. As shown in FIG. 5, an alignment process is performed by alignment system 500, to align one or more of cameras 202a. In this process, a projector 502 projects an image 508 for detection by cameras 202a. Projector 502 may be any device capable of projecting an image suitable for detection by cameras 202a, such as a display device, e.g., a monitor, television, other flat panel display, or the like. Image 508 includes an image of a number of shapes 510 which have been pre-distorted to produce specified shapes when viewed through a particular lens system. For example, image 508 may include a number of shapes 510 that are pre-distorted to produce shapes when viewed through a lens system such that the projection of shapes 510 onto the lenses of cameras 202a results in certain desired shapes at certain desired locations within images captured by cameras 202a. In an example, shapes 510 are calculated to produce an array of rectangles in the images generated by cameras 202a. Embodiments of the disclosure contemplate any desired shape generated in images of cameras 202a, where the shapes 510 are those shapes which are calculated to generate these desired shapes in the images produced by cameras 202a.

In operation, projector 502 projects image 508 upon the lenses of cameras 202a. The images 508 each contain shapes 510 which are determined such that, when passed through lenses shaped according to the nominal or specified dimensions of the lenses of cameras 202a, predetermined shapes are generated in the images output by cameras 202a. As one example, the shapes 510 are calculated and selected such that, when viewed by theoretical lenses having the nominal dimensions of the lenses of cameras 202a, images output by cameras 202a contain particular desired shapes such as rectangles. That is, while any desired shape is contemplated for the images output by cameras 202a, shapes 510 are determined such that they generate those desired shapes within the images output by cameras 202a.

Processor 506 then directs alignment actuators 504, which are operably coupled to the lenses of cameras 202a, to manipulate the orientations of the lenses of cameras 202a such that the resulting shapes in camera 202a images correspond closely in shape and location to the desired shapes. That is, the alignment actuators 504 align the lenses of cameras 202a such that the images of shapes 510 within the images output by cameras 202a align closely with the desired shapes and their locations. Close alignment indicates that the lenses and sensor arrays of cameras 202a are properly aligned, whereupon the principal points and effective focal lengths of cameras 202a are determined as described below, facilitating more accurate calibration.

Figure 6:
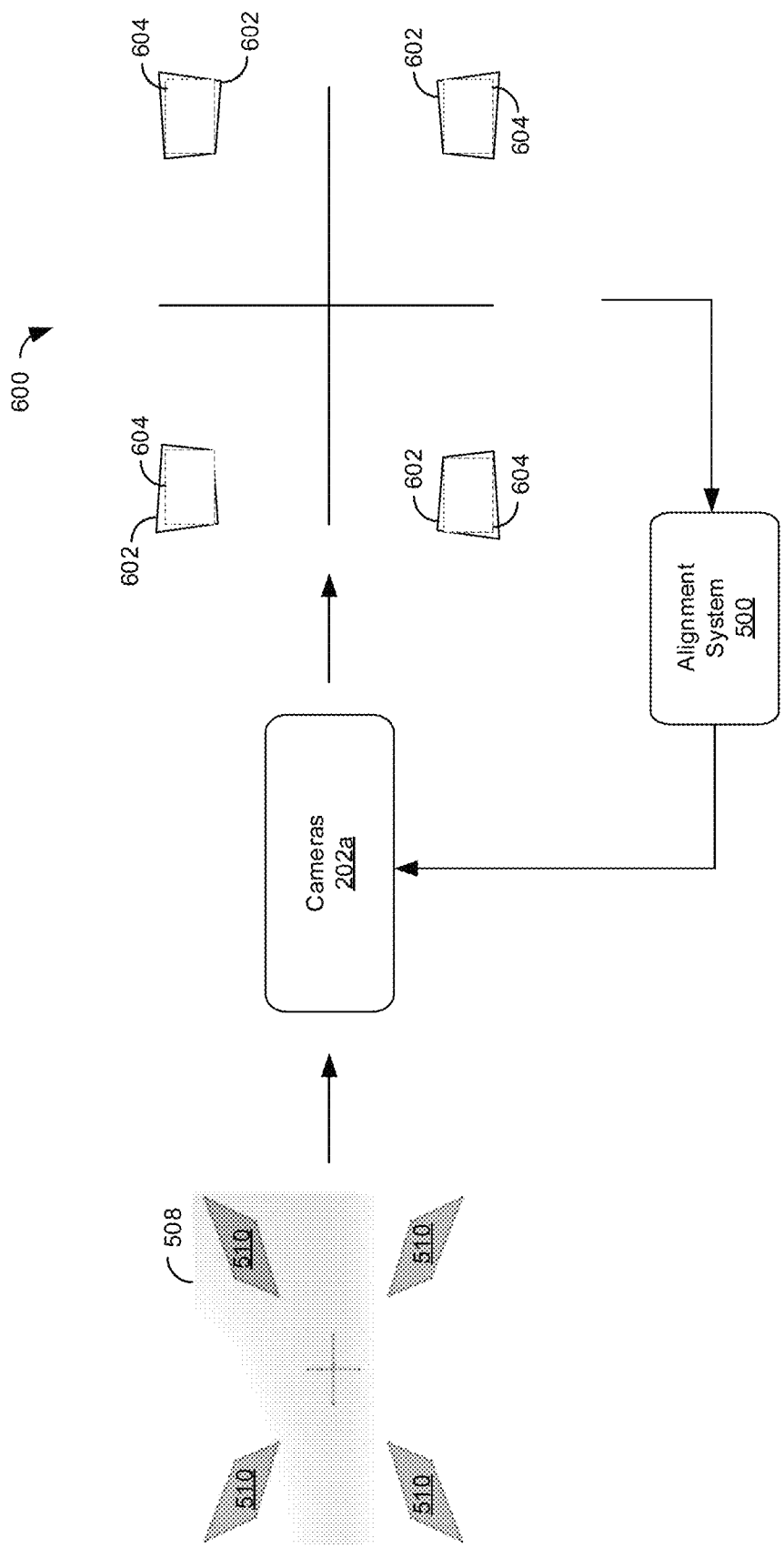
FIG. 6 is a more detailed diagram of an implementation of a process for camera alignment using pre-distorted targets.

FIG. 6 illustrates the process of FIG. 5 in further detail. An image 508 is displayed for detection by cameras 202a, where the image 508 contains a number of shapes 510. The shapes 510 are chosen such that, when projected through a theoretical or nominal lens or lenses having the dimensions and properties specified for the lens(es) of cameras 202a, a predetermined shape is generated in the resulting image. For example, shapes 510 may be selected such that they appear as rectangles 604 in image 600 produced by cameras 202a. More specifically, shapes 510 may be selected to produce a specified array of rectangles 604 of particular dimensions, when projected through hypothetical, perfectly aligned lenses having the dimensions specified for lenses of cameras 202a. The actual shapes 602 which appear in image 600 are then compared to the rectangles 604 that would be generated by an ideal, perfectly shaped and aligned lens, with alignment system 500 performing lens alignment using the degree of correspondence between the two as feedback.

In this manner, a pattern of shapes 604 useful in performing camera alignment is first selected. From this pattern, shapes 510 are determined as those shapes which generate the pattern of shapes 604 when viewed through theoretical or nominal lenses of cameras 202a. That is, shapes 510 are those shapes which produce shapes 604 when distorted by theoretical or nominal lenses of cameras 202a. Accordingly, embodiments of the disclosure employ shapes 510 that are pre-distorted so as to produce regular or otherwise desired shapes 604 when subjected to distortion by the lenses of cameras 202a which they are intended to align. Embodiments of the disclosure thus generate pre-distorted images or shapes 510 specific to each lens system, for aligning that lens system by comparison of the resulting images to the theoretical image those shapes would produce if that lens system were perfectly aligned.

While shapes 604 are shown in FIG. 6 as rectangles, it is noted that embodiments of the disclosure contemplate any geometry of shapes 604 without limitation. For example, shapes 604 may be squares, any polygon or multi-sided shapes, circles, ovals, or the like. In some embodiments of the disclosure, shapes 604 include at least some slanted, straight sides, for facilitating modulation transfer function (MTF) calculation. Furthermore, embodiments of the disclosure contemplate any number and arrangement of shapes 604, which may each be the same shape or may differ from one another in any manner.

Alignment system 500 may be any system for performing an alignment process on a camera, such as an active alignment station capable of manipulating camera lenses or other components for centering, alignment, and the like. Alignment system 500 aligns lenses, sensor arrays, or other camera components according to the degree of alignment between ideal rectangles 604 and the shapes 602 that actually appear in images 600. That is, using images 600 as feedback, alignment system 500 manipulates various camera 202a components, such as lenses and/or sensor arrays, until shapes 602 align as closely as desired with the sizes, shapes, and positions of rectangles 604. Camera 202a components are then deemed aligned, or as closely aligned as desired.

Figure 7:
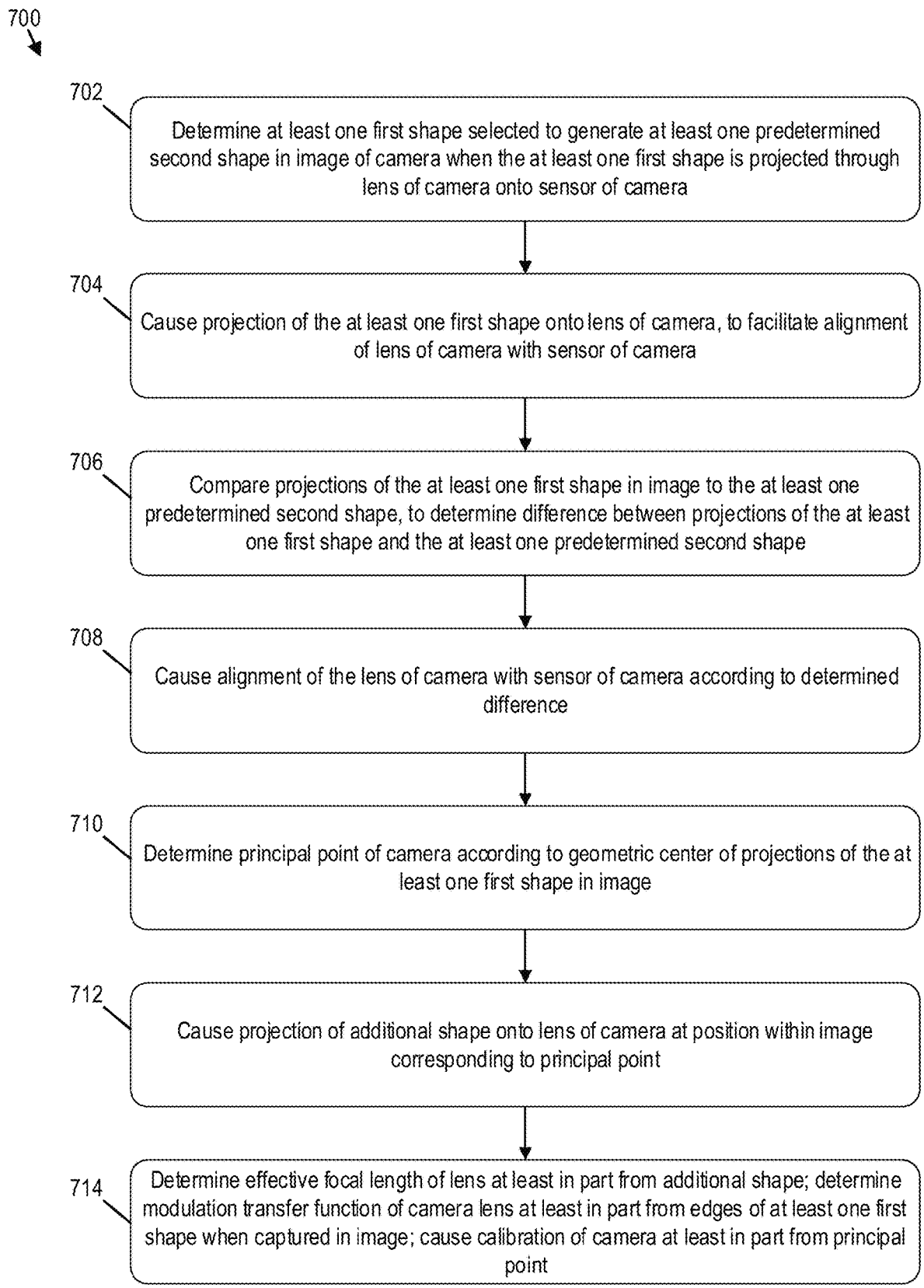
FIGS. 7-8 are flowcharts of processes for camera alignment using pre-distorted targets.

Referring now to FIG. 7, illustrated is a flowchart of a process 700 for camera alignment using pre-distorted targets. In some embodiments, one or more of the steps described with respect to process 700 are performed (e.g., completely, partially, and/or the like) while cameras 202a are installed in autonomous vehicle 102, as above. Additionally or alternatively, in some embodiments one or more steps described with respect to process 700 are performed (e.g., completely, partially, and/or the like) on cameras 202a while cameras 202a are located remote from autonomous vehicle 102, such as prior to installation of cameras 202a in autonomous vehicle 102. Furthermore, pre-distorted shapes 510 may be determined at any time prior to alignment of cameras 202a, or may be determined by, e.g., alignment system 500, during camera alignment.

Initially, alignment system 500 determines at least one first shape (e.g., pre-distorted shapes 510) selected to generate at least one predetermined second shape (e.g., rectangles 604) in an image of a camera 202a when the at least one first shape is projected through a lens of camera 202a onto a sensor or sensor array of camera 202a (Step 702). As above, alignment system 500 selects an arrangement of one or more second shapes, such as rectangles 604, which lend themselves well to alignment or other processes. For example, an array of rectangles 604 may be chosen, although any distribution of any shapes may be selected. Alignment system 500 then calculates the shapes 510 which will produce rectangles 604 in image 600 after distortion by the lenses of cameras 202a. That is, alignment system 500 selects a desired pattern in an output image 600 of a camera, and calculates those shapes which should produce this desired pattern when projected through the nominal lens system of that camera.

Next, alignment system 500 projects, or causes projection of, the at least one first shape onto the lens of camera 202a, to facilitate alignment of the lens of camera 202a with the sensor array of camera 202a (Step 704). For example, alignment system 500 generates image 508 of shapes 510 on projector 502, to project image 508 upon cameras 202a. Cameras 202a then generate one or more images 600 captured by their sensor arrays, and transmit these images 600 to alignment system 500. Alignment system 500 then compares the projections of the at least one first shape (e.g., shapes 602) in image 600 to the at least one second shape (e.g., rectangles 604), to determine differences between the two (Step 706). For example, alignment system 500 may superimpose an image of rectangles 604 upon an image 600 of shapes 602, as shown in FIG. 6, to visually display differences between the two. Alignment system 500 then causes alignment of the lens of camera 202*a* with its sensor array, according to the difference between shapes 602 and rectangles 604 (Step 708). As an example, alignment system 500 automatically manipulates lenses and/or sensor arrays of cameras 202*a* via alignment actuators 504, to reduce or minimize differences in size, shape, and/or position between shapes 602 and rectangles 604. Alternatively, or in addition, alignment system 500 may allow manual manipulation of lenses and/or sensor arrays of cameras 202*a* via alignment actuators 504, to reduce or minimize differences in size, shape, and/or position between shapes 602 and rectangles 604 according to operator perception and input. During this process, cameras 202*a* may output multiple images 600, such as in real time or substantial real time, to provide continuous feedback for alignment processes.

Once alignment system 500 has sufficiently aligned the lenses and sensor arrays of cameras 202*a*, system 500 further determines other optical properties of camera 202*a*, and performs other desired processes on camera 202*a*. In an example, image 508 includes a number of shapes 510 that are pre-distorted to produce shapes when viewed through a lens system such that the projection of shapes 510 onto the lenses of cameras 202*a* results in certain desired shapes at certain desired locations within images captured by cameras 202*a*. In such an example, alignment system 500 determines the principal point of camera 202*a* based on the geometric center of projections of the at least one first shape in image 600, e.g., the geometric center of shapes 602 (Step 710). That is, in embodiments of the disclosure, the principal point of camera 202*a* is determined as the geometric center of the pattern of shapes 602 resulting from display of pre-distorted shapes 510, when the camera 202*a* is sufficiently aligned.

Once the principal point is determined, system 500 causes projection of an additional shape onto the lens of camera 202*a*, at a position within its output image 600 corresponding to the principal point (Step 712). That is, an additional shape is added to image 508 at the determined principal point. Embodiments of the disclosure contemplate use of any shape for use as this additional shape.

One of ordinary skill in the art will realize that, principal point having been determined, various other optical properties of camera 202*a* may further be determined, such as effective focal length and MTF. One of ordinary skill in the art will also realize that processes such as calibration may also be carried out for camera 202*a*. Accordingly, in the process of FIG. 7, alignment system 500 determines the effective focal length of the lens system of camera 202*a* at least in part from this additional shape, and further determines the MTF of the camera 202*a* lens system at least in part from edges of at least one of the first shapes (e.g., shapes 602) of image 600, as well as perform or cause to be performed a calibration process for camera 202*a* (Step 714).

In this manner, principal points are determined in simpler and more accurate manner. Additionally, determined principal points may be employed as initial guesses in camera calibration processes, leading to more accurate calibration resulting from more accurate initial principal point estimates.

Figure 8:
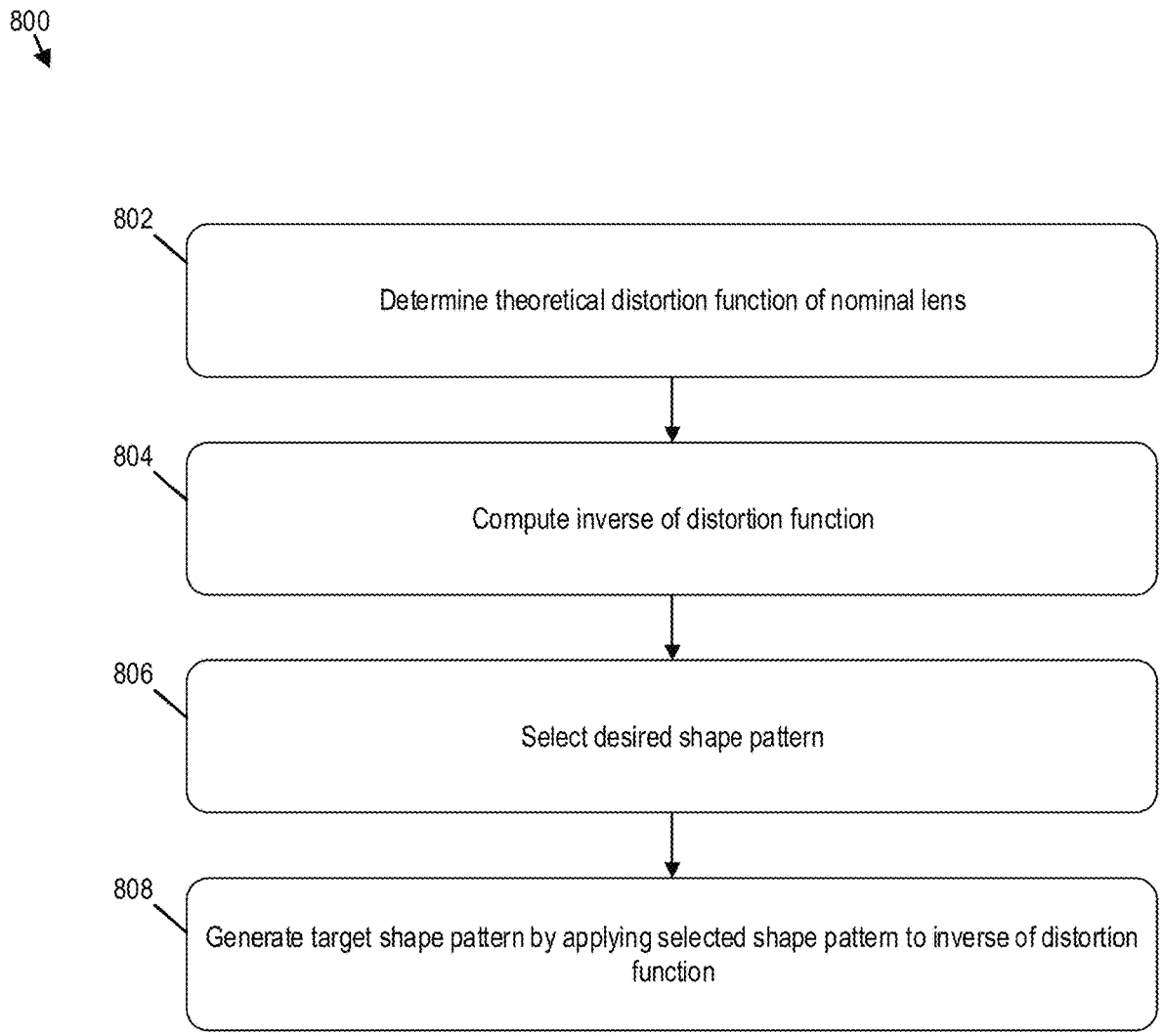

FIG. 8 is a flowchart illustrating further details of Step 702 above, for determining pre-distorted shapes 510. As described above, in an example, image 508 includes a number of shapes 510 that are pre-distorted to produce shapes when viewed through a lens system such that the projection of shapes 510 onto the lenses of cameras 202*a* results in certain desired shapes at certain desired locations within images captured by cameras 202*a*. Desired shapes 604 are determined first, and pre-distorted shapes 510 are then determined from those desired shapes 604 and the specified dimensions of the lenses to be used, e.g., the nominal or theoretical lenses based upon which the actual lenses of camera 202*a* are fabricated. Accordingly, the alignment system 500 determines the theoretical distortion function of the nominal lens system from the dimensions and properties of the materials specified for the nominal lenses (Step 802). Alignment system 500 then computes the inverse of this distortion function (Step 804), and select the desired shapes 604 and their pattern or layout (Step 806). Alignment system 500 then generates the target shape 510 pattern by applying the selected pattern of shapes 604 to the inverse distortion function (Step 808). In this manner, shapes 510 are pre-distorted versions of desired shapes 604, distorted such that further distortion by the nominal lens system reverts them to desired shapes 604.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A device comprising:
    at least one processor; and
    at least one memory storing instructions, wherein execution of the instructions by the at least one processor causes the at least one processor to:
        determine a distortion of a first pattern of shapes causes generation of a second pattern of shapes; and
        cause a projection of the first pattern of shapes through a lens onto a sensor, wherein the projection of the first pattern of shapes through the lens onto the sensor causes generation of a third pattern of shapes in an image, wherein alignment of the lens with the sensor is based on a comparison of the third pattern of shapes to the second pattern of shapes.

2. The device of claim 1, wherein to determine the distortion of the first pattern of shapes, the execution of the instructions by the at least one processor causes the at least one processor to:
    determine the distortion of the first pattern of shapes based on simulating projection of the first pattern of shapes through the lens onto the sensor.

3. The device of claim 1, wherein to determine the distortion of the first pattern of shapes, the execution of the instructions by the at least one processor causes the at least one processor to:
    determine the distortion of the first pattern of shapes based on projection of the first pattern of shapes through a first lens onto a first sensor,
    wherein to cause the projection of the first pattern of shapes through the lens onto the sensor, the execution of the instructions by the at least one processor causes the at least one processor to:

cause the projection of the first pattern of shapes through a second lens onto a second sensor.

4. The device of claim 1, wherein to determine the distortion of the first pattern of shapes, the execution of the instructions by the at least one processor causes the at least one processor to:
  determine the distortion of the first pattern of shapes by a first lens,
  wherein to cause the projection of the first pattern of shapes through the lens onto the sensor, the execution of the instructions by the at least one processor causes the at least one processor to:
    cause the projection of the first pattern of shapes through a second lens onto the sensor.

5. The device of claim 1, wherein to determine the distortion of the first pattern of shapes, the execution of the instructions by the at least one processor causes the at least one processor to:
  determine the distortion of the first pattern of shapes by a first lens having one or more lens dimensions,
  wherein to cause the projection of the first pattern of shapes through the lens onto the sensor, the execution of the instructions by the at least one processor causes the at least one processor to:
    cause the projection of the first pattern of shapes through a second lens having the one or more lens dimensions onto the sensor.

6. The device of claim 1, wherein the execution of the instructions by the at least one processor further causes the at least one processor to:
  determine a difference between the third pattern of shapes and the second pattern of shapes.

7. The device of claim 1, wherein the execution of the instructions by the at least one processor further causes the at least one processor to:
  determine a difference between at least one of a shape, size, or position of the third pattern of shapes and at least one of a shape, size, or position of the second pattern of shapes.

8. The device of claim 1, wherein the execution of the instructions by the at least one processor further causes the at least one processor to:
  cause an alignment of the lens with the sensor based on the comparison to reduce at least one difference between the second pattern of shapes and the third pattern of shapes.

9. The device of claim 1, wherein the execution of the instructions by the at least one processor further causes the at least one processor to:
  reduce at least one difference between the second pattern of shapes and the third pattern of shapes by automatically manipulating, using at least one actuator, at least one of the lens or the sensor based on the comparison.

10. The device of claim 1, wherein to cause the projection of the first pattern of shapes through the lens onto the sensor, the execution of the instructions by the at least one processor causes the at least one processor to:
  cause a first projection of the first pattern of shapes through the lens onto the sensor, wherein the first projection of the first pattern of shapes through the lens onto the sensor causes generation of the third pattern of shapes in a first image, wherein the execution of the instructions by the at least one processor further causes the at least one processor to:
    cause an alignment of the lens with the sensor based on the comparison to reduce at least one difference between the second pattern of shapes and the third pattern of shapes; and
    cause a second projection of the first pattern of shapes through the lens as aligned with the sensor, wherein the second projection of the first pattern of shapes through the lens as aligned with the sensor causes generation of a fourth pattern of shapes in a second image, wherein further alignment of the lens with the sensor is further based on a comparison of the fourth pattern of shapes to the second pattern of shapes.

11. The device of claim 1, wherein to cause the projection of the first pattern of shapes through the lens onto the sensor, the execution of the instructions by the at least one processor causes the at least one processor to:
  cause the projection of the first pattern of shapes through the lens of a camera onto the sensor.

12. The device of claim 1, wherein to cause the projection of the first pattern of shapes through the lens onto the sensor, the execution of the instructions by the at least one processor causes the at least one processor to:
  cause the projection of the first pattern of shapes through the lens of a camera of a vehicle onto the sensor.

13. The device of claim 1, wherein to cause the projection of the first pattern of shapes through the lens onto the sensor, the execution of the instructions by the at least one processor causes the at least one processor to:
  cause the projection of the first pattern of shapes through the lens of a camera onto the sensor,
  wherein the execution of the instructions by the at least one processor further causes the at least one processor to:
    calibrate the camera based on the comparison to reduce at least one difference between the second pattern of shapes and the third pattern of shapes.

14. The device of claim 1, wherein to cause the projection of the first pattern of shapes through the lens onto the sensor, the execution of the instructions by the at least one processor causes the at least one processor to:
  cause the projection of the first pattern of shapes through the lens of a camera onto the sensor,
  wherein the execution of the instructions by the at least one processor further causes the at least one processor to:
    determine one or more optical properties of the camera based on the comparison.

15. The device of claim 1, wherein the execution of the instructions by the at least one processor further causes the at least one processor to:
  display the image.

16. A method comprising:
  determining, using at least one processor, a distortion of a first pattern of shapes causes generation of a second pattern of shapes; and
  causing, using the at least one processor, a projection of the first pattern of shapes through a lens onto a sensor, wherein the projection of the first pattern of shapes through the lens onto the sensor causes generation of a third pattern of shapes in an image, wherein alignment of the lens with the sensor is based on a comparison of the third pattern of shapes to the second pattern of shapes.

17. The method of claim 16, wherein the first pattern of shapes is associated with at least one first shape, wherein the second pattern of shapes is associated with at least one second shape, and wherein the third pattern of shapes is associated with at least one third shape.

18. The method of claim 16, wherein determining the distortion of the first pattern of shapes causes generation of the second pattern of shapes comprises:
   determining the second pattern of shapes;
   based on determining the second pattern of shapes, determining the distortion of the first pattern of shapes causes generation of the second pattern of shapes; and
   determining the first pattern of shapes based on determining the distortion of the first pattern of shapes causes generation of the second pattern of shapes.

19. The method of claim 16, wherein determining the distortion of the first pattern of shapes causes generation of the second pattern of shapes comprises:
   determining the first pattern of shapes;
   based on determining the first pattern of shapes, determining the distortion of the first pattern of shapes causes generation of the second pattern of shapes; and
   determining the second shape second pattern of shapes based on determining the distortion of the first pattern of shapes causes generation of the second pattern of shapes.

20. The method of claim 16, further comprising:
   causing an alignment of the lens with the sensor based on the comparison to reduce at least one difference between the second pattern of shapes and the third pattern of shapes.

21. The method of claim 16, further comprising:
   reducing at least one difference between the second pattern of shapes and the third pattern of shapes by automatically manipulating, using at least one actuator, at least one of the lens or the sensor based on the comparison.

22. At least one non-transitory storage media storing instructions, wherein execution of the instructions by a computing system comprising a processor causes the computing system to:
   determine a distortion of a first pattern of shapes causes generation of a second pattern of shapes; and
   cause a projection of the first pattern of shapes through a lens onto a sensor, wherein the projection of the first pattern of shapes through the lens onto the sensor causes generation of a third pattern of shapes in an image, wherein alignment of the lens with the sensor is based on a comparison of the third pattern of shapes to the second pattern of shapes.

23. The at least one non-transitory storage media of claim 22, wherein the execution of the instructions by the computing system further causes the computing system to:
   cause an alignment of the lens with the sensor based on the comparison to reduce at least one difference between the second pattern of shapes and the third pattern of shapes.

24. The at least one non-transitory storage media of claim 22, wherein the execution of the instructions by the computing system further causes the computing system to:
   reduce at least one difference between the second pattern of shapes and the third pattern of shapes by automatically manipulating, using at least one actuator, at least one of the lens or the sensor based on the comparison.

* * * * *